(12) United States Patent
Van Haaren et al.

(10) Patent No.: US 9,366,373 B2
(45) Date of Patent: Jun. 14, 2016

(54) PRESSURE ABSORBER FOR A FLUID SYSTEM AND METHOD OF USE

(71) Applicant: AMTROL Licensing Inc., West Warwick, RI (US)

(72) Inventors: Christopher A. Van Haaren, Warwick, RI (US); Christopher Kampf, Chepachet, RI (US); Michael Cogliati, Warwick, RI (US); Alexander Goudas, Webster, MA (US)

(73) Assignee: AMTROL Licensing Inc., West Warwick, RI (US)

( * ) Notice: Subject to any disclaimer, the term of this patent is extended or adjusted under 35 U.S.C. 154(b) by 95 days.

(21) Appl. No.: 14/282,539

(22) Filed: May 20, 2014

(65) Prior Publication Data

US 2015/0338011 A1    Nov. 26, 2015

(51) Int. Cl.
*F16L 55/04* (2006.01)
*F16L 55/053* (2006.01)

(52) U.S. Cl.
CPC ............. *F16L 55/043* (2013.01); *F16L 55/053* (2013.01)

(58) Field of Classification Search
CPC ...... F16L 55/041; F16L 55/043; F16L 55/045
USPC .......... 138/30, 26; 137/207; 220/721
See application file for complete search history.

(56) References Cited

U.S. PATENT DOCUMENTS

| | | | |
|---|---|---|---|
| 2,474,512 A * | 6/1949 | Stephens | F16L 55/052 100/170 |
| 2,638,932 A * | 5/1953 | Alexander | F15B 1/106 138/30 |
| 2,808,070 A * | 10/1957 | Malsbary | F16L 55/05 138/26 |
| 3,061,039 A * | 10/1962 | Peters | F16L 55/02 138/121 |
| 4,651,781 A * | 3/1987 | Kandelman | F15B 1/086 138/26 |
| 4,823,844 A | 4/1989 | Bartholomew | |
| 6,016,841 A | 1/2000 | Larsen | |

(Continued)

FOREIGN PATENT DOCUMENTS

| | | |
|---|---|---|
| JP | 02-286997 A | 11/1990 |
| JP | 2012092868 A | 5/2012 |

OTHER PUBLICATIONS

PCT International Search Report dated Aug. 26, 2015 issued on corresponding PCT International Application No. PCT/US2015/031733.

(Continued)

*Primary Examiner* — Patrick F Brinson
(74) *Attorney, Agent, or Firm* — Locke Lord LLP; Scott D. Wofsy

(57) ABSTRACT

Disclosed is an absorber system for absorbing pressure shocks and fluid volume shocks in a fluid system. In particular, the absorber system includes a housing with a joint for insertion within a fluid system, wherein the housing interior is in fluid communication with fluid in the fluid system. As such, when a pressure and/or fluid volume shock is developed within the fluid system, fluid is forced into the housing via the joint. A membrane is disposed within the housing in such a way that the fluid impacts the membrane which, in response, flexes to absorb and control the pressure and/or fluid volume shock within the fluid system. The absorber system, thus, controls pressure and/or fluid volume shock within a system and can prevent water hammer and other problems which can result from the development of pressure and/or fluid volume shock.

19 Claims, 3 Drawing Sheets

(56) References Cited

U.S. PATENT DOCUMENTS

| | | | |
|---|---|---|---|
| 6,672,337 B2 * | 1/2004 | Kobayashi | F16L 55/045 137/207 |
| 7,562,678 B1 * | 7/2009 | Kulikov | F16L 55/041 137/207 |
| 2002/0059959 A1 | 5/2002 | Qatu et al. | |

OTHER PUBLICATIONS

Written Opinion of the International Searching Authority dated Aug. 26, 2015 issued on corresponding PCT International Application No. PCT/US2015/031733.

* cited by examiner

Existing design w/ Air Cushion compressed
(air cushion compresses due to pressure)

Existing design with Air Cushion
(water cushion on left)
(Diaphragm ▨ separates air/water)

PRESSURE ABSORBER FOR A FLUID SYSTEM AND METHOD OF USE

FIELD OF INVENTION

The present invention generally relates to a pressure absorber, and, more particularly, to a water pressure absorber for absorbing pressure associated with a shock wave in a water system, and a method of use thereof.

BACKGROUND

Shock waves occur in fluid systems when a flow in the supply is quickly and abruptly closed or when a force in flow is suddenly changed. The fluid system is usually a liquid system, but sometimes also is a gas system. Such shock waves commonly occur when a valve is closed at an end of a piping system, resulting in a pressure wave propagating in the pipe, which is commonly referred to as a water hammer.

This closure of the supply or sudden change in momentum of the flow can cause major problems. For example, a buildup of water flow can be created resulting in a pressure spike that physically can rattle the pipes causing noise and vibration. This noise and vibration can often be heard and felt within a dwelling or building. The water hammer also produces stress on the pipes and components in the system, which can lead to failure in the system and water damage.

While the presence of water hammer cannot always be anticipated when planning plumbing layouts, it can be corrected. In particular, in order to prevent violent pipe noise, system failure, and damage, devices have been developed to provide the high pressure spike somewhere to go.

For example, shock suppressors have been developed to reduce the pressure spike in the system. Such shock suppressors, also referred to as water hammer arrestors, utilize a precharge of air to provide an air cell or air cushion that absorbs the pressure shock in the system. One example of a shock suppressor is an air chamber in the form of a vertical pipe located in a wall of piping at a point near a faucet. Another example of a shock suppressor is placement of a valve where the water-supply pipe exits the wall. The air chamber acts as cushions to prevent impact between the water and the piping. As the pressure shock enters the shock suppressor, the air cushion compresses, the air pressure increases, and the shock is absorbed. Such shock suppressors can be incorporated in a system via a valve or the like. Such designs generally include a movable piston that is sealed to the inner diameter of the pipe. The air charge on one side of the piston provides resistance to water pressure on the other side of the piston until the water pressure increases above the air charge pressure. When this occurs, the expanded water pushes on the piston and enters the pipe.

Such shock suppressors have may associated disadvantages, including leakage of air charge, which results in loss of pressure acceptance function. Also, such seals are typically dynamic o-ring seals, which have the potential to lose their sealing capability with debris or due to a poor surface condition of the inner diameter of the pipe or the o-ring.

Further shock absorbers have been developed which include a flexible diaphragm separating the air cushion from the water stream that enters the shock absorber. One example of such a shock absorber is depicted in FIGS. 1A-1B. Such a shock absorber may be located extending from a wall of piping such that, as the water flow is abruptly stopped or changed, the water can enter the shock absorber. As the water enters the shock absorber, it comes into contact with the diaphragm which is pushed towards the air cushion on a side opposite the water side to thereby compress the air cushion. This contact with the diaphragm and compression of the air cushion acts to absorb the pressure shock.

While such shock suppressors are capable of reducing water hammer and addressing the problems resulting from water hammer, they are susceptible to losing their ability to absorb pressure shock and volume expansion over time. In particular, the diaphragm often weakens and fails, for example, at an outer edge or at an inside portion along the diaphragm. This failure reduces and often eliminates the ability of the shock suppressor to absorb water and pressure shock. Further, if the diaphragm fails and allows water to pass through into the air cushion, the water entering the air cushion side comes into contact with what is generally an unprotected steel or corrodable metal housing, leading to corrosion and rust in the system. As such, regular maintenance of this type of shock absorber is required, often resulting in the need to replace the entire system. In addition, in these shock suppressors, a precharge of air is required to provide the air cushion. This complicates the design and application and maintenance of the shock absorber.

SUMMARY

The present invention provides an improved absorber apparatus that can be provided in a water system so as to absorb pressure and/or water volume increases in the system. The absorber apparatus is simple in design and requires little maintenance.

According to various embodiments, the present invention provides a pressure absorber system that allows water under pressure to enter the system to allow control and absorption of pressure shock waves in pipe lines. In particular, in a water piping system, when a faucet is open, water flows under pressure in the pipes. Then when the faucet is shut off, the sudden closure can cause rapid pressure build-up at the faucet. As a result, shock waves begin to form and travel back along the pipe line. The pressure absorber system of the present invention accepts and absorbs this shock wave before it becomes annoying and potentially damaging.

The present invention also provides an improved volume expansion absorber that absorbs a volume of water from a system. For example, when water in a system is heated, it expands, which results in an increased volume of water in the system that must be accommodated. The present volume expansion absorber absorbs this increased volume of water.

According to one aspect, the present invention provides an absorber system which does not utilize a precharged air cushion to absorb a pressure shock or a water volume increase. In particular, rather than utilize a precharged air cushion, the system of the present invention includes a membrane being shaped and being fabricated of a material such that the membrane itself provides resistance to the water hammer/volume expansion/pressure, thereby absorbing the volume expansion and/or pressure. According to the present invention, the membrane is fabricated of a material and is configured and arranged so that it flexes to absorb volume expansion and/or pressure. Preferably, the absorber system is configured such that the structure and positioning of the membrane within the system allows the membrane itself to absorb the water volume and/or pressure. The material provides resistance because the interior of the hollow shape maintains a reference pressure to the shock pressure on the exterior. Therefore, the increase in external pressure by the shock, forces the material to flex inward into the reference pressure of the hollow shape thereby absorbing the system shock pressure.

According to another aspect, the present invention provides an absorber system insertable within a fluid system, comprising a hollow housing, a joint in fluid communication with the hollow housing, and a membrane disposed within the hollow housing such that fluid forced into the housing through the joint comes into contact with the membrane. In particular, the membrane is disposed within the housing and has a flexibility such that as a pressure wave and/or volume of water is forced into the housing, it comes into contact with the membrane which flexes to absorb the water volume increase and/or pressure shock from the fluid force and thus reduce the shock wave in the fluid system and/or the volume increase. According to various embodiments, the membrane is hollow and/or contains one or more air pockets.

According to various embodiments, the absorber can be used in any fluid system by simply connecting the absorber to a pipe via the joint. As such, no modification to the fluid system is necessary to use the present absorber.

According to various embodiments, the membrane is formed in any shape having a space into which the membrane can flex within. For example, according to preferred embodiments, the membrane is hollow in shape, thus providing a space or cavity into which it can flex to absorb a pressure shock and/or volume of water. According to other embodiments, the membrane contains one or more air pockets formed therein, thus providing the space into which it can flex. In some embodiments, the membrane can be both hollow and can be provided with one or more air pockets (e.g., within the walls of the hollow membrane), both of which can absorb a pressure shock and/or volume of water. The hollow membrane can be provided with a first flexibility and the one or more air pockets can be provided with a second flexibility (and additional flexibilities, if desired, by providing different air pockets with differing flexibilities) different than the first flexibility so as to provide varying levels of shock wave absorption capabilities and/or water volume absorption capabilities within a single membrane. Such differing flexibilities can be provided through the use of various materials of differing flexibilities and/or differing wall thicknesses of the hollow membrane, and/or differing wall thicknesses above the air pocket(s). A further embodiment is to utilize multiple hollow membranes within the housing. In addition to greater pressure or volume absorption, this allows redundancy by continuing to provide performance even when one or some of the multiple hollow membranes fails to a point of being ineffective as an individual membrane.

According to various embodiments, an inner surface of the housing is similar in shape and/or size to at least a portion of an outer surface of the membrane, preferably the entire outer surface of the membrane.

The membrane can be formed in any shape including, for example, spherical, cylindrical, egg-shaped, cube-like, etc. as well as any variety of random shapes. The spherical, cylindrical, egg or otherwise shaped membrane can be hollow and/or can contain one or more air pockets into which the membrane can flex so as to absorb pressure as needed.

According to an exemplary embodiment, the membrane is cylindrically shaped and is disposed within the housing so that a volume of fluid and/or pressure from a fluid force comes into contact with a flat drum side which flexes to absorb pressure and/or a volume of water. According to another exemplary embodiment, the membrane is egg shaped and is disposed within the housing so that a volume of fluid and/or pressure from a fluid force comes into contact with the egg shaped membrane parallel to a major axes of the egg shaped membrane, such that the egg shaped membrane flexes across the major axis rather than a minor diameter.

According to various embodiments, a plurality of membranes can be provided disposed within the housing of the absorption system. In some embodiments, the plurality of membranes can be provided with the same shape, size, materials, and/or pressure/water absorption capabilities. In other embodiments, the plurality of membranes can be provided with differing shapes, sizes, materials, and/or pressure/water absorption capabilities. Such embodiments are beneficial if larger water volume expansions are anticipated because the plurality of membranes can compress towards each other resulting in a first absorption capacity, and each individual membrane can further absorb an amount of pressure and/or water volume resulting in a second absorption capacity. Further, in the event that one of the membranes fail, the system can continue to function as needed because the remainder of the membranes can still function to absorb pressure and/or water volume. Also, if desired, a new membrane can be simply added to the plurality of membranes disposed within the housing.

The membrane can be fabricated on any material that provides adequate flexibility for absorbing pressure and/or a volume of fluid. In particular, the material is preferably one which allows the membrane to adequately flex while still maintaining its general shape during absorption of pressure and/or water. For example, soft, easily compressed materials can be suitably used in forming the membrane. The membrane is preferably formed of an engineered material and is formed with a wall thickness such that as it flexes, resistance is provided. Such materials can include, for example, PORON® (microcellular urethanes), rubber, butyl, ethylene propylene diene monomers (EPDM), neoprene, silicone, plastisol (flexible PVC), and the like.

According to preferred embodiments, the membrane is configured such that the resistance matches and absorbs the water pressure that comes into contact with the membrane. Further, the flexing of the membrane also allows a volume of water to be absorbed within the shock wave absorber. The shock wave absorber system can be formed and provided in a system to address pressure shocks and/or water volume increases in pipe lines resulting from various sources including, for example, formation of a water volume to be absorbed as the result of water expansion due to heating or water pressure due to pumping from a well.

According to various embodiments, the membrane is further formed to have a wall thickness that, together with the material used in forming the membrane, provides the membrane with the properties that are needed in order for the membrane to provide control and absorption of pressure shocks and or water volume expansion as needed. As such, a larger variety of materials can potentially be used by combining, if desired, a less flexible material with a thinner wall or a more flexible material with a thicker wall so as to obtain a membrane having the necessary properties. Further, the membrane can be formed of more than one material and/or with varying thicknesses at different locations along its shape so as to target one or more locations at which pressure is to be absorbed. It is also possible to provide varying levels of flexibility along the shape of the membrane such that exposure to varying pressure shocks can be absorbed as needed depending on the level of the pressure shock.

According to various embodiments, the membrane can be configured such that it deforms as it absorbs pressure and/or a volume of water and then returns to its original shape when it is not under pressure and/or is not absorbing the increased volume of water. The membrane can also be configured such that it does not return to its original shape when it is not exposed to pressure and/or an increased volume of water. In either case, the membrane is fabricated such that it is provided with a resistance, in its original shape or in its deformed shape, that allows it to absorb subsequent pressure fluctuations and/or water volume fluctuations in the system repeatedly.

The membrane of the present invention can be fabricated so as to have more or less flexibility depending on its desired use. For example, a membrane having a greater flexibility will provide a greater water volume absorption capability because the membrane will be capable of flexing more into itself to absorb a greater quality of water. On the other hand, a membrane having a greater rigidity will provide a lesser less water volume absorption capability because the membrane will be capable of flexing less into itself less.

According to another aspect, the present invention provides a pressure absorption system which comprises a membrane that contains, within the membrane itself, a precharged air cushion to absorb a pressure shock. In this embodiment, the membrane is fabricated such that the membrane itself provides less resistance on its own to a pressure shock than the embodiment which does not utilize a precharged air cushion. In this embodiment, the precharged air cushion, which is injected into the membrane, primarily provides the membrane with the resistance to the pressure shock. The membrane material and the air cushion contained therein are together configured and arranged so that the membrane flexes to absorb volume expansion and/or pressure. Preferably, the absorber system is configured such that the structure and positioning of the membrane within the system allows the membrane itself to absorb the water volume and/or pressure.

According to various embodiments, the membrane having the precharge of air contained therein is flexible much like a balloon. As such, on its own, the membrane does not provide any structure or capacity to absorb pressure and/or water volume. Instead, the membrane must be injected with the precharge of air to provide the membrane with a structure and capacity to absorb pressure and/or water volume.

Additional objects and advantages of the invention will be set forth in part in the description which follows, and in part will be obvious from the description, or may be learned by practice of the invention. The objects and advantages of the invention will be realized and attained by means of the elements and combinations disclosed herein, including those pointed out in the appended claims. It is to be understood that both the foregoing general description and the following detailed description are exemplary and explanatory only and are not restrictive of the invention as claimed. The accompanying drawings, which are incorporated in and constitute a part of this specification, illustrate several embodiments of the invention and, together with the description, serve to explain the principles of the invention.

BRIEF DESCRIPTION OF THE DRAWINGS

FIGS. 1A-1B are cross-sectional views of a conventional shock absorber, in which FIG. 1A shows the shock absorber in a state of no pressure, and FIG. 1B shows the shock absorber in a state in which an air cushion therein is compressed due to absorption of pressure;

FIGS. 3A-3B are examples of absorber systems which include a spherical shaped membrane for absorbing pressure and/or water volume in which FIG. 3A is an exploded view and FIG. 3B is an assembled perspective view.

Figure 1B:
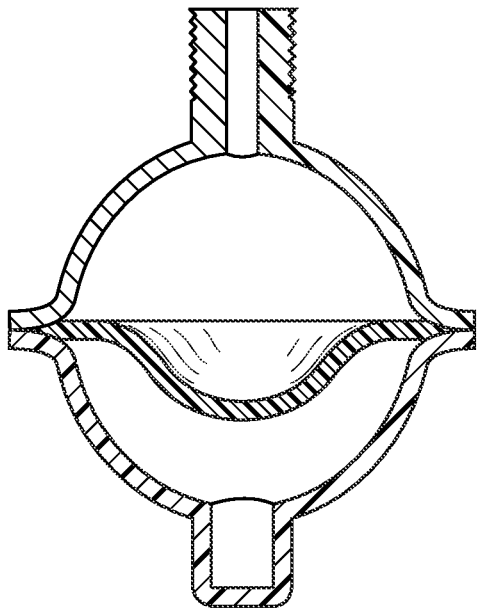
Figure 1A:
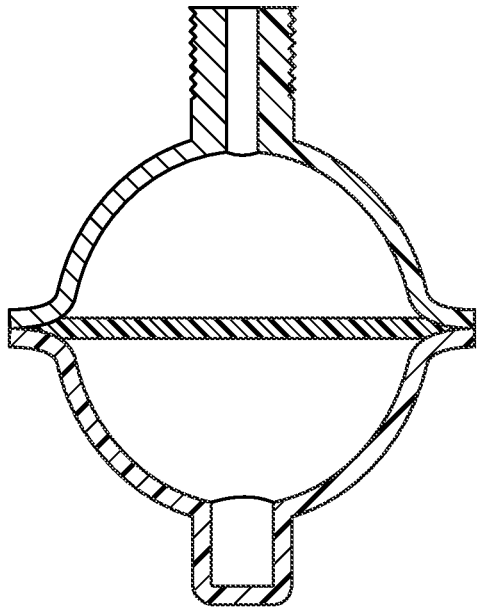

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DEFINITIONS

To facilitate an understanding of the present invention, a number of terms and phrases are defined below.

As used herein, the singular forms "a", "an", and "the" include plural forms unless the context clearly dictates otherwise. Thus, for example, reference to "a sensor" includes reference to more than one sensor.

Unless specifically stated or obvious from context, as used herein, the term "or" is understood to be inclusive.

The term "including" is used herein to mean, and is used interchangeably with, the phrase "including but not limited to."

As used herein, the terms "comprises," "comprising," "containing," "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As referred to herein, a "hollow" membrane is one which is formed by a continuous outer wall which completely encloses an interior void. Examples of such hollow membranes can include hollow spheres, hollow cylinders, hollow egg-shapes, random hollow shapes, and the like.

As referred to herein, a membrane having one or more "air pockets" refers to a solid structure or substantially solid structure, which contains one or more encased voids therein. As such, a membrane having one or more air pockets can be in the form of a solid ball or the like having one or more voids that are positioned and configured so as to absorb pressure and allow the solid or substantially solid ball to compress as it absorbs pressure. Further, a membrane can be in the form of a hollow membrane wherein one or more air pockets are provided within the thickness of the wall forming the hollow membrane.

Any devices, components, apparatus, or methods provided herein can be combined with one or more of any of the other devices, components, apparatus, and methods provided herein.

DETAILED DESCRIPTION

The present invention provides a system and method that solves the problem of shock waves and water hammer which develop in a fluid system, including both a liquid and gas system. In particular, the present invention provides an absorber system, particularly a pressure absorber and/or water volume absorber, that can be installed in the piping of a fluid system such that a sudden change or stop in fluid flow through the piping, which results in a fluid and pressure wave propagating in the pipe, causes in the fluid and pressure wave to enter the pressure absorber which controls and absorbs the fluid and pressure wave. The absorber system is capable of absorbing pressure shock waves and fluid waves and preventing water hammer.

Figure 2:
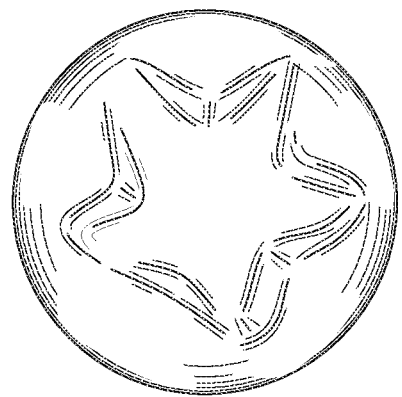
FIG. 2 is a view of an example membrane having a spherical shape and showing how the membrane flexes to absorb pressure and/or water volume according to one embodiment.

Referring now to FIGS. 2-3, an exemplary absorber system 10 is shown, wherein the absorber system 10 includes a membrane 12 having a generally spherical shape.

The absorber system 10 is generally configured to be insertable within a fluid system, such as extending from a wall of a pipe in fluid communication with the contents of the pipe. Generally, fluid is present in the fluid system and in communication with the absorber system 10 during normal operation of the fluid system and in the presence of a pressure shock wave and/or fluid shock wave.

Figure 3A:
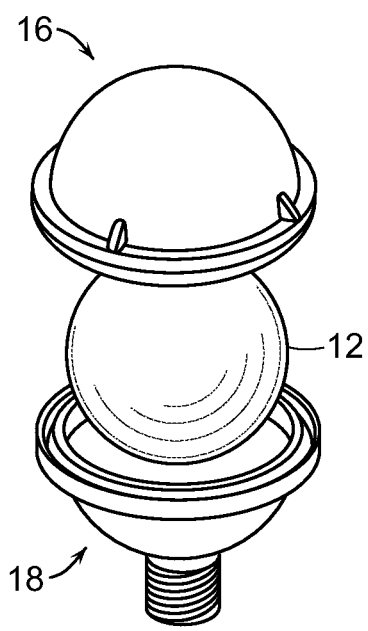
Figure 3B:
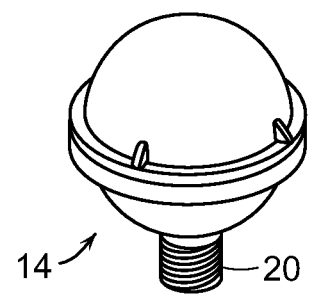

As shown in the embodiment in FIGS. 3A-3B, the absorber system 10 includes a housing 14 and a joint 20 extending from a bottom of the housing 14. The joint 20 is configured for insertion through a pipe in a fluid system and is hollow so as to allow the flow of fluid from the fluid system into the joint 20. The housing 14 is also hollow and is in fluid communication with the joint 20 such that fluid from the fluid system entering the joint 20 flows into the housing 20. The housing 14 and joint 20 can be any shape and are not particularly limited in size. According to an exemplary embodiment, the housing 14 is similar in shape to the membrane 12 housed therein. Further, the joint 14 can be narrower in size than the pipe of the fluid system in which it is inserted such that fluid flowing through the pipe will flow through the pipe generally rather than be diverted into the joint 20 unless a pressure shock and/or water shock wave is created which forces fluid from the pipe into the joint 20. Of course, the joint 20 can be provided such that fluid is always present in the joint and the housing 14 regardless of whether a pressure shock or fluid shock wave is present, and wherein a pressure shock and or fluid shock wave further forces fluid from the pipe into the joint for absorption by the absorber system 10.

According to preferred embodiments, the joint 20 is formed such that it can be placed on an existing pipe, conduit, pipeline or the like within a fluid system, even while there is fluid under pressure in the pipe, etc. It is not necessary to cut the pipe and install a tee-joint therein in order to insert the absorber system 10. Further, the piping does not have to be spliced or changed, and does not have to be drained in order to install the absorber system 10. There is further no need to use a professional plumber to install the absorber system 10. The absorber system 10 can simply be installed in a top side of the pipe and extending upwards. The absorber system 10 can be inserted in many types of pipe, including thin-walled and lightweight copper tubing (as used for water lines) as well as plastic pipes. Because the membrane 12 of the invention is completely self-contained (i.e., is formed so as to be flexible and compressible to absorb pressure and/or a fluid volume on its own), the absorber system 10 is fully functional once it is inserted in a pipe with the joint 20 extending into the pipe in fluid communication with the contents thereof.

As shown in FIGS. 2-3, the membrane 12 is depicted as being spherical in shape. However, any other shapes of membranes 12 can suitably be used as long as the membrane 12 is hollow and/or contains one or more air pockets to allow the membrane 12 to flex and compress when exposed to a pressure shock or water volume increase, thereby controlling and absorbing the pressure shock and preventing water hammer.

Figure 4A:
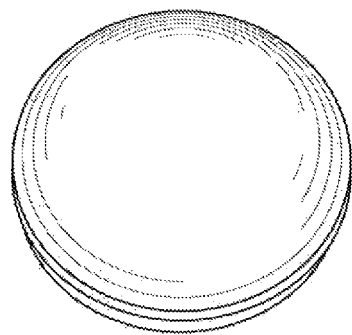
FIGS. 4A-4B show embodiments of a membrane that is shaped and fabricated of a material such that the membrane shown in FIG. 4A provides resistance itself rather than through use of an air precharge, and the membrane shown in FIG. 4B uses a precharge of air.

According to one embodiment of the present invention (e.g., as shown in the embodiment in FIGS. 4A and 5), by providing a hollow membrane that is both rigid and flexible, the membrane itself can absorb pressure and/or a water volume increase. This is in contrast to the conventional use a diaphragm provided with an air precharge, because in such diaphragm systems, it is the air precharge that provides the absorption of pressure and/or water volume increase by compressing the air in a fixed volume.

Figure 4B:
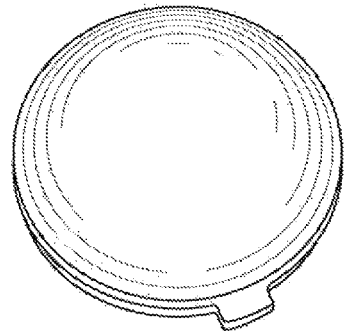
Figure 5:
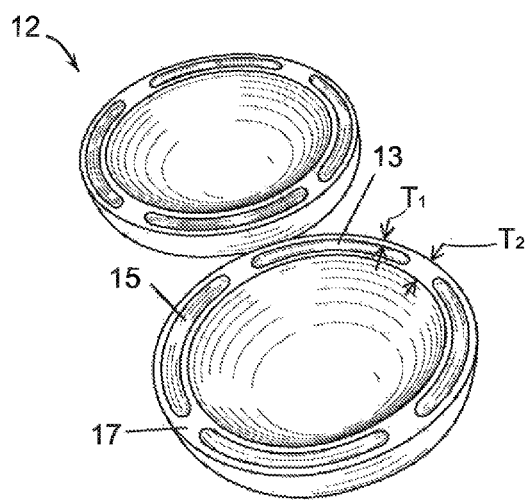
FIG. 5 shows the membranes of FIG. 4A, with the membrane being cut open to show the relatively thicker wall than the membrane of FIG. 4B, which has a precharge of air.

According to another embodiment of the present invention (e.g., as shown in the embodiment in FIGS. 4B and 5), a hollow membrane 12 is provided that contains, within the membrane itself, a precharged air cushion to absorb a pressure shock. In such an embodiment, the precharged air cushion primarily provides the membrane 12 with the resistance to the pressure shock and/or water volume increase. As shown in FIGS. 4B and 5, this embodiment containing the air precharge generally has a thinner and more flexible membrane compared with the embodiment that does not contain an air precharge.

As shown in FIGS. 3A-3B, the housing 14 can be of a shape similar to that of the membrane 12 housed thereon. Of course, the housing 14 shape is not limited to shapes corresponding to that of the membrane contained therein provided that it can adequately house the membrane 12 and allow the membrane 12 to come into contact with fluid forced inside of the housing 14 as the result of a pressure shock and/or water volume increase and flex and compress as a result of such contact. Preferably, the housing 14 is sized and shaped such that there is not excessive space surrounding the membrane 12 which could result in the water forced into the housing 14 as the result of a pressure shock to come into contact with the outer walls of the housing 14 rather than, or in addition to, coming into contact with the membrane 12. This would be undesirable because the membrane 12 is fabricated so as to flex and compress to absorb and control the pressure shock. On the other hand, the housing 14 is generally a more rigid structure which does not flex and compress and, thus, this could result in inadequate absorption and control of the pressure shock. As such, it is preferable that the inner structure of the housing 14 and the outer surface of the membrane 12 are complimentary to encourage fluid forced into the pressure absorber to come into contact with the membrane 12 so that the pressure shock can be adequately absorbed and controlled.

According to some embodiments, the membrane 12 is configured such that is both hollow and contains one or more air pockets. In particular, the membrane can be provided such that one or more portions of the membrane 12 are hollow (e.g. a right half or other fraction or the membrane) while a remainder of the membrane 12 contains one or more air pockets. For example, the membrane 12 can have an overall spherical shape, with a right half being hollow in shape and a left half being solid or substantially solid and containing on or more air pockets therein. The hollowness of the membrane 12 or the one or more air pockets are configured such that the membrane flexes and compresses to absorb pressure. According to another embodiment, the entire membrane 12 can be hollow and the one or more air pockets 13 can be formed within a thickness of the walls forming the membrane 12.

As described, the membrane 12 is designed so as to be flexible and to be compressible such that pressure applied thereto results in the membrane flexing and compressing to absorb the pressure and/or water volume increase. As such, the materials which can suitably be used in forming the membrane 12 include those which are flexible. Some suitable materials include PORON®, rubber, butyl, ethylene propylene diene monomers (EPDM), neoprene, silicone, plastisol (flexible PVC), and the like.

In addition, the membrane 12 can be designed such that when it is hollow, it has a wall thickness that also can contribute to providing the desired flexibility. In the case of membranes 12 which are more solid in form and contain one or more air pockets, the air pockets are typically provided at an outer portion of the membrane 12 to provide compression into the air pocket when pressure is applied to the membrane 12. As such, the thickness of material forming the membrane 12 above the air pocket can contribute to providing the desired compressibility.

According to an exemplary embodiment, the membrane 12 is a spherically shaped hollow structure formed of PORON®. The structure is one which flexes to absorb pressure but which generally maintains its overall spherical shape under pressure. Such a structure is one in which the membrane has some flexibility, but is rigid enough not to deform.

According to another exemplary embodiment, the membrane 12 is cylindrical in shape and is positioned with the flat drum portions extending along the direction of the pipe flow. As such, as water is forced into the pressure absorber 10, it comes into contact with the flat drum portion which flexes and absorbs the pressure. While the flat drum portion flexes to absorb pressure, the cylindrical membrane 12 as a whole generally maintains its cylindrical shape.

According to another exemplary embodiment, the membrane 12 is egg shaped and is positioned within the absorber system 10 such that it is impacted by water so as to flex across its major axis rather than its minor diameter.

In any of the above or other embodiments, the material and/or thickness of the membrane can be designed such that random flex provides performance. In particular, the membrane can be provided such that it is made of a variety of materials 15 and 17 in different locations and/or can be provided with a plurality of different wall thicknesses $T_1$ and $T_2$ so as to provide varying degrees of flex upon being subjected to a pressure shock. As such, the membrane is capable of flexing depending upon the size of the shock wave and/or the location of the membrane that is subjected to the shock wave.

The present absorber system 10 and membrane 12 design is advantageous because the membrane 12 is one piece in design, and is a stand-alone component which is formed of a material and thickness such that when it comes into contact with a water volume increase and/or pressure shock, it absorbs and controls the volume increase and/or pressure shock in a system. This membrane 12 is a separate part from the absorber system 10 that is contained within the housing 14 and, thus, can be removed and replaced as desired while maintaining the rest of the pressure absorber components. In certain embodiments, there is no requirement for a means for air precharge and, thus, no parts for air precharge are required. Still further, the design of the membrane and the absorber system 10 is such that there is no potential for loss of air precharge and, therefore, loss of function over time. In addition, embodiments of the present absorber system 10 are maintenance-free, so there is no need for inspection and maintenance of air precharge.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An absorber system insertable within a fluid system, comprising:
    a hollow housing;
    a joint in fluid communication with the hollow housing; and
    a membrane disposed within the hollow housing such that fluid forced into the housing through the joint comes into contact with the membrane, wherein the membrane is flexible so as to absorb a shock wave from the fluid force and thus reduce the shock wave in the fluid system, wherein the membrane is hollow, and wherein pressure applied to the membrane causes the membrane to flex and compress inwardly within a hollow portion of the membrane, wherein the membrane further includes one or more air pockets, and wherein the hollow membrane is provided with a first flexibility, and wherein the one or more air pockets are provided with at least a second flexibility different than the first flexibility.

2. An absorber system insertable within a fluid system, comprising:
    a hollow housing;
    a joint in fluid communication with the hollow housing; and
    a membrane disposed within the hollow housing such that fluid forced into the housing through the joint comes into contact with the membrane, wherein the membrane is flexible so as to absorb a shock wave from the fluid force and thus reduce the shock wave in the fluid system, wherein the membrane contains one or more air pockets, and wherein pressure applied to the membrane causes the membrane to flex and compress inwardly within the one or more air pockets, wherein the one or more air pockets are provided with at least two differing flexibilities.

3. The shock wave absorber system of claim 1, wherein the membrane is fabricated of a material selected from the group consisting of PORON®, rubber, butyl, ethylene propylene diene monomers (EPDM), neoprene, silicone, flexible PVC, and combinations thereof.

4. An absorber system insertable within a fluid system, comprising:
    a hollow housing;
    a joint in fluid communication with the hollow housing; and
    a membrane disposed within the hollow housing such that fluid forced into the housing through the joint comes into contact with the membrane, wherein the membrane is flexible so as to absorb a shock wave from the fluid force and thus reduce the shock wave in the fluid system, wherein the membrane is hollow, wherein pressure applied to the membrane causes the membrane to flex and compress inwardly within a hollow portion of the membrane, wherein the hollow membrane is formed with differing wall thicknesses along the hollow membrane and/or formed of a plurality of materials along the hollow membrane so as to provide the membrane with varying flexibilities.

5. The shock wave absorber system of claim 1, wherein an inner surface of the housing is similar in shape and/or size to an entire outer surface of the membrane.

6. The shock wave absorber system of claim 1, wherein the membrane is at least one of spherically shaped, cylindrically shaped and disposed within the housing so that fluid force comes into contact with a flat drum side which flexes to absorb pressure, and egg shaped and disposed within the housing so that fluid force comes into contact with the egg shaped membrane parallel to a major axes of the egg shaped membrane, such that the egg shaped membrane flexes across the major axis rather than a minor diameter.

7. A pressure absorber for a fluid system comprising a flexible membrane, the flexible membrane being hollow and containing one or more air pockets, wherein the flexible membrane compresses into a hollow of the membrane and/or within one or more air pockets to absorb a shock wave contacting the membrane, wherein the hollow membrane is provided with a first flexibility, and wherein the one or more air pockets are provided with at least a second flexibility different than the first flexibility.

8. The pressure absorber of claim 7, wherein the membrane is fabricated of a material selected from the group consisting of PORON®, rubber, butyl, ethylene propylene diene monomers (EPDM), neoprene, silicone, flexible PVC, and combinations thereof.

9. A pressure absorber for a fluid system comprising a flexible membrane, the flexible membrane being hollow and/or containing one or more air pockets, wherein the flexible membrane compresses into a hollow of the membrane and/or within one or more air pockets to absorb a shock wave contacting the membrane, and wherein the hollow membrane is formed with differing wall thicknesses along the hollow membrane and/or of a plurality of materials along the hollow membrane so as to provide the membrane with varying flexibilities, and/or wherein the one or more air pockets are provided with at least two differing flexibilities.

10. The shock wave absorber system of claim 1, wherein the membrane contains an air precharge housed therein.

11. The shock wave absorber system of claim 2, wherein the membrane is fabricated of a material selected from the group consisting of PORON®, rubber, butyl, ethylene propylene diene monomers (EPDM), neoprene, silicone, flexible PVC, and combinations thereof.

12. The shock wave absorber system of claim 2, wherein an inner surface of the housing is similar in shape and/or size to an entire outer surface of the membrane.

13. The shock wave absorber system of claim 2, wherein the membrane is at least one of spherically shaped, cylindrically shaped and disposed within the housing so that fluid force comes into contact with a flat drum side which flexes to absorb pressure, and egg shaped and disposed within the housing so that fluid force comes into contact with the egg shaped membrane parallel to a major axes of the egg shaped membrane, such that the egg shaped membrane flexes across the major axis rather than a minor diameter.

14. The shock wave absorber system of claim 2, wherein the membrane contains an air precharge housed therein.

15. The shock wave absorber system of claim 4, wherein the membrane is fabricated of a material selected from the group consisting of PORON®, rubber, butyl, ethylene propylene diene monomers (EPDM), neoprene, silicone, flexible PVC, and combinations thereof.

16. The shock wave absorber system of claim 4, wherein an inner surface of the housing is similar in shape and/or size to an entire outer surface of the membrane.

17. The shock wave absorber system of claim 4, wherein the membrane is at least one of spherically shaped, cylindrically shaped and disposed within the housing so that fluid force comes into contact with a flat drum side which flexes to absorb pressure, and egg shaped and disposed within the housing so that fluid force comes into contact with the egg shaped membrane parallel to a major axes of the egg shaped membrane, such that the egg shaped membrane flexes across the major axis rather than a minor diameter.

18. The shock wave absorber system of claim 4, wherein the membrane contains an air precharge housed therein.

19. The pressure absorber of claim 9, wherein the membrane is fabricated of a material selected from the group consisting of PORON®, rubber, butyl, ethylene propylene diene monomers (EPDM), neoprene, silicone, flexible PVC, and combinations thereof.

* * * * *